United States Patent [19]

Whisenant

[11] Patent Number: 5,379,547

[45] Date of Patent: Jan. 10, 1995

[54] PLANT CULTIVATION APPARATUS AND METHOD

[76] Inventor: Blake Whisenant, P.O. Box 207 - Hwy. 62, Parrish, Fla. 34219

[21] Appl. No.: 976,351

[22] Filed: Nov. 17, 1992

Related U.S. Application Data

[63] Continuation-in-part of Ser. No. 546,448, Jul. 2, 1990, Pat. No. 5,193,306.

[51] Int. Cl.⁶ ............................................. A01G 25/00
[52] U.S. Cl. ............................................. 47/79; 47/66
[58] Field of Search ............ 47/95, 66 B, 44 R, 45 R, 47/70, 31, 26 F, 79

[56] References Cited

U.S. PATENT DOCUMENTS

| | | | |
|---|---|---|---|
| 1,533,342 | 4/1925 | Schein | 47/79 |
| 1,789,994 | 6/1929 | Whittbold . | |
| 2,081,337 | 5/1937 | Lockyer | 47/79 |
| 2,132,568 | 10/1938 | Jacobs | 47/31 |
| 2,870,574 | 1/1959 | Sheridan | 47/59 |
| 2,940,219 | 6/1960 | Schiller | 47/95 |
| 3,613,309 | 7/1969 | Coburn . | |
| 3,775,903 | 8/1971 | Pike . | |
| 3,821,863 | 6/1973 | Chan . | |
| 3,987,584 | 11/1975 | Yellin . | |
| 4,014,135 | 5/1976 | Greenbaum . | |
| 4,121,608 | 2/1977 | MacLeod . | |
| 4,133,141 | 12/1977 | Lee . | |
| 4,161,844 | 12/1975 | Hentschel et al. . | |
| 4,209,945 | 9/1978 | Dent et al. . | |
| 4,454,684 | 3/1983 | O'Hare . | |
| 4,545,145 | 3/1983 | Torrance et al. . | |
| 4,837,990 | 6/1989 | Peleg | 47/26 F |
| 5,107,621 | 4/1992 | Deutschmann, Sr. | 47/79 |

FOREIGN PATENT DOCUMENTS

| | | | |
|---|---|---|---|
| 11401 | of 1901 | United Kingdom | 47/45 R |
| 2198324 | 6/1988 | United Kingdom . | |
| 2237964 | 5/1991 | United Kingdom | 47/70 |
| 8402827 | 8/1984 | WIPO | 47/66 B |

*Primary Examiner*—Ramon S. Britts
*Assistant Examiner*—Joanne C. Dawns
*Attorney, Agent, or Firm*—Cushman, Darby & Cushman

[57] ABSTRACT

An apparatus and method for conserving water and reducing labor in growing plants, particularly commercially grown tomatoes and cucumbers. The invention includes a reservoir container assembly and an arch support structure. The reservoir container assembly comprises a reservoir container capable of holding water as well as a bag container disposed on top of the reservoir container for holding a plant growing medium. Water in the reservoir container is connected via a hygroscopic medium to the growing medium inside the bag container. The top surface of the bag container is provided with at least two openings. A plant grows through one opening, and evaporation takes place through a second remote opening. In use, a plurality of such reservoir container assemblies may be disposed in a line in a field and a series of arch support structures disposed between them. The plants which grow out of the bag containers and over the arch support structure are thereby supported off the ground. Plants grown in this way do not need to be manually tied to any support structure. They are easily tended, weeded, sprayed and picked.

5 Claims, 7 Drawing Sheets

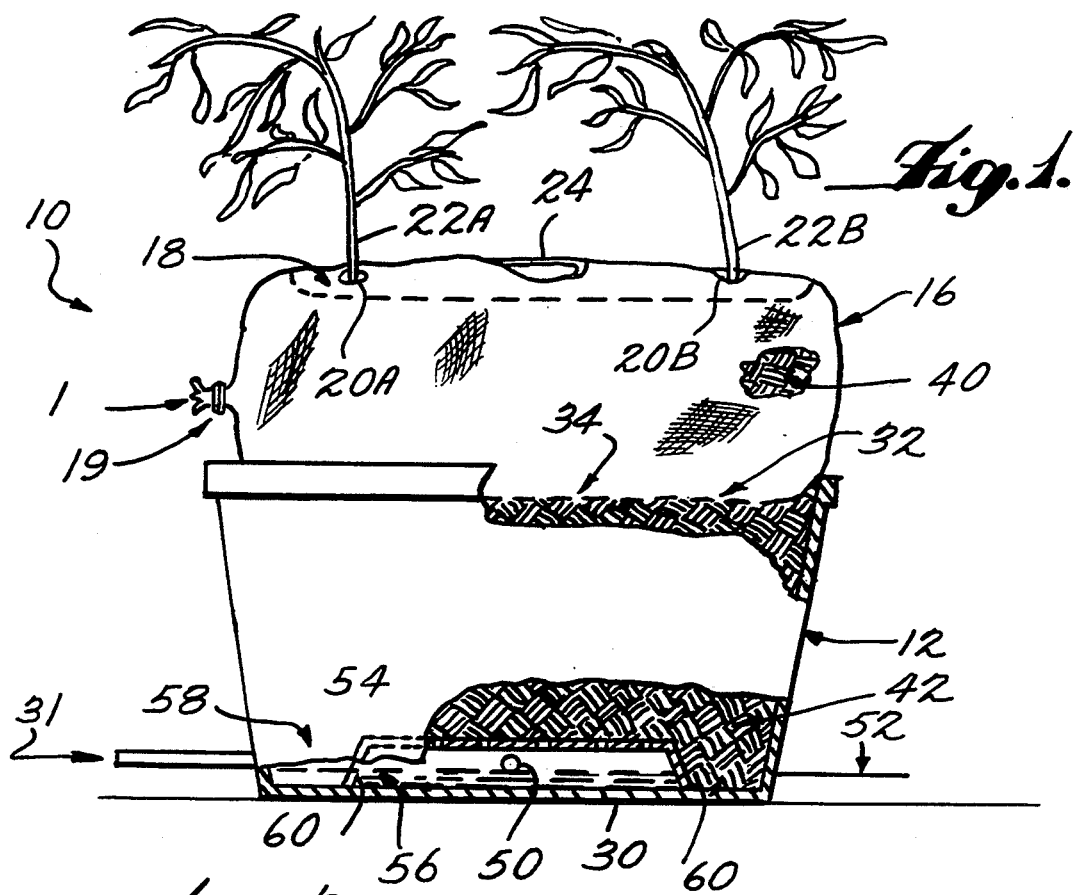

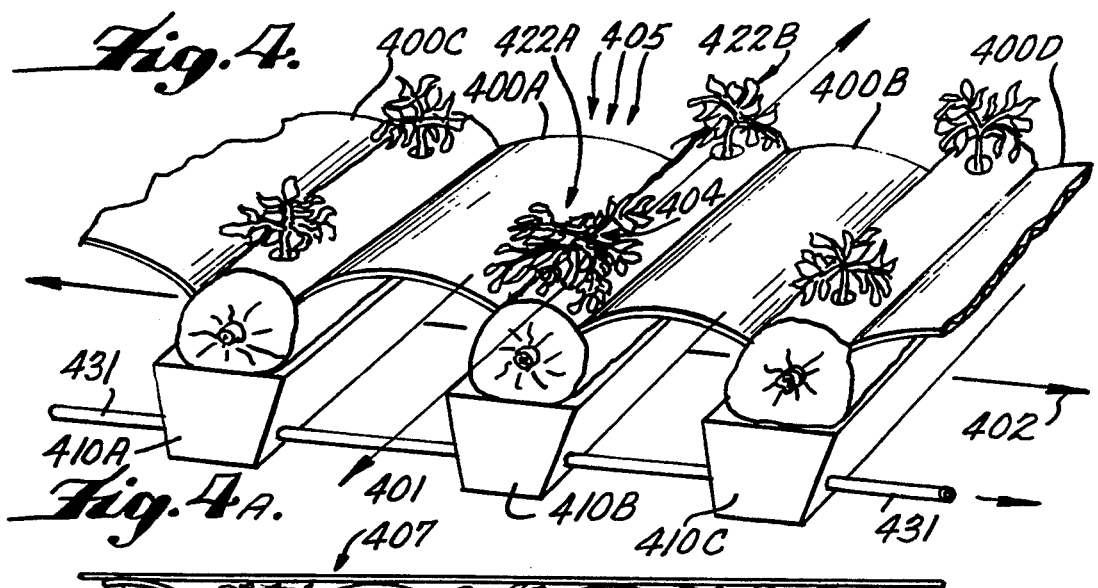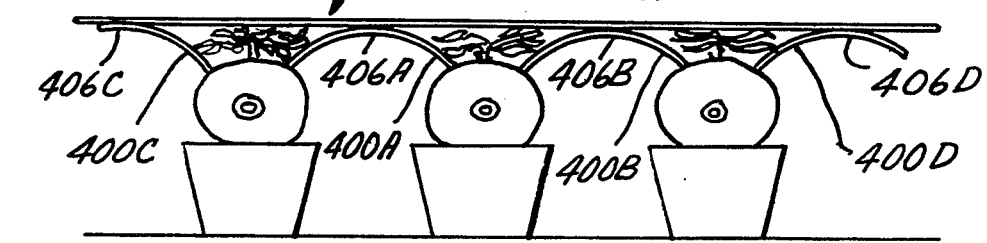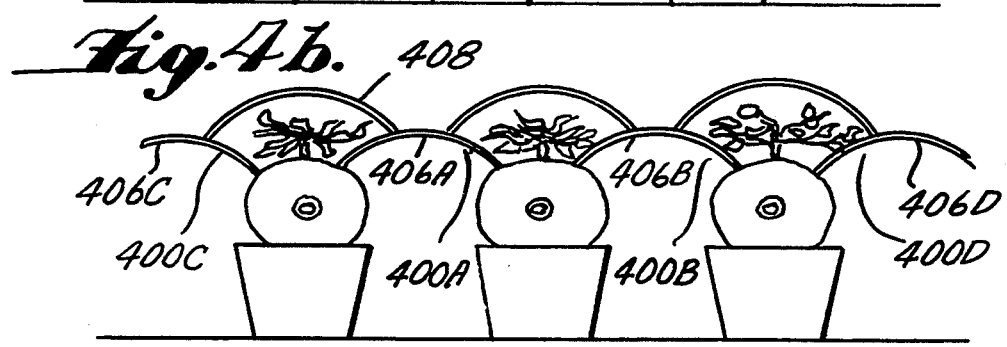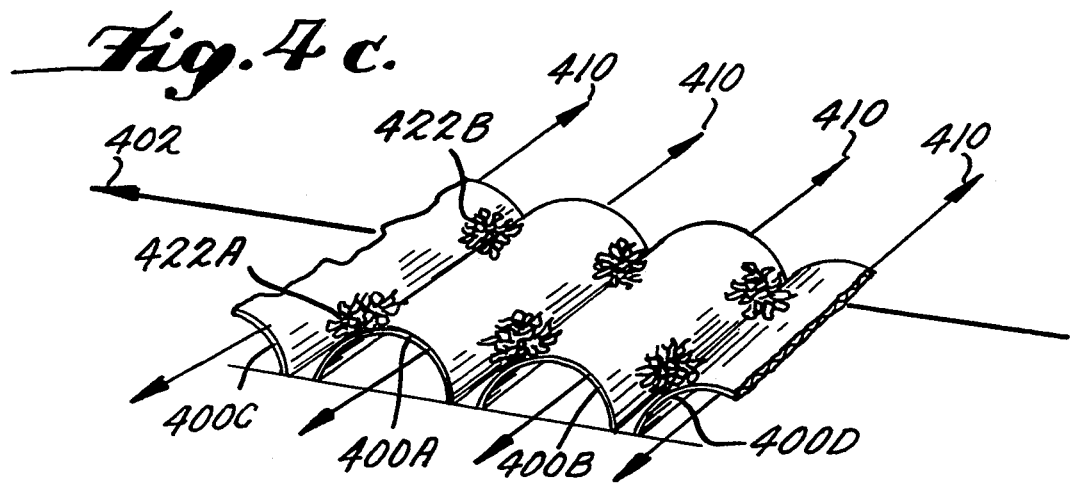

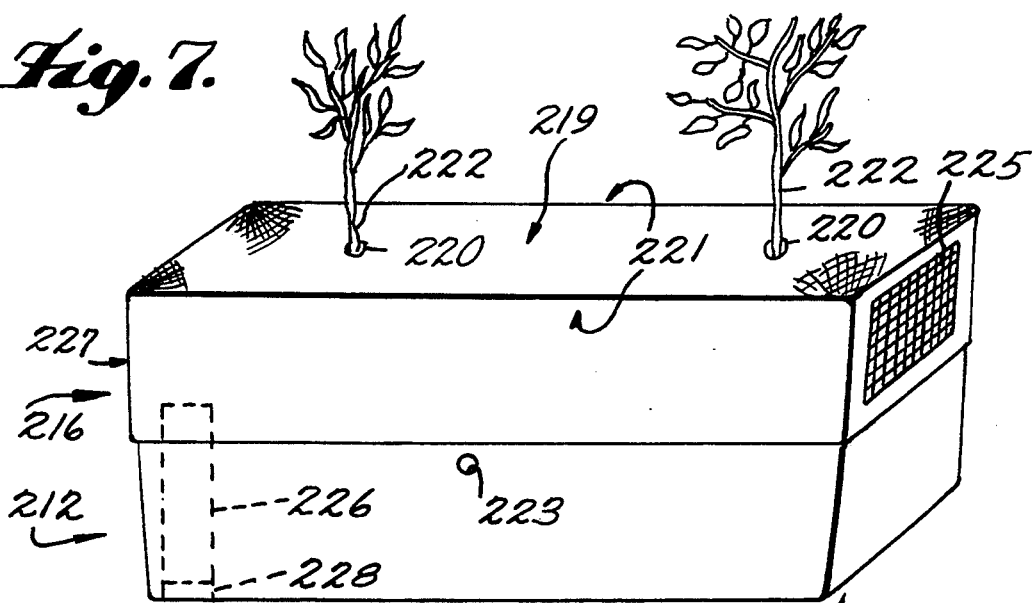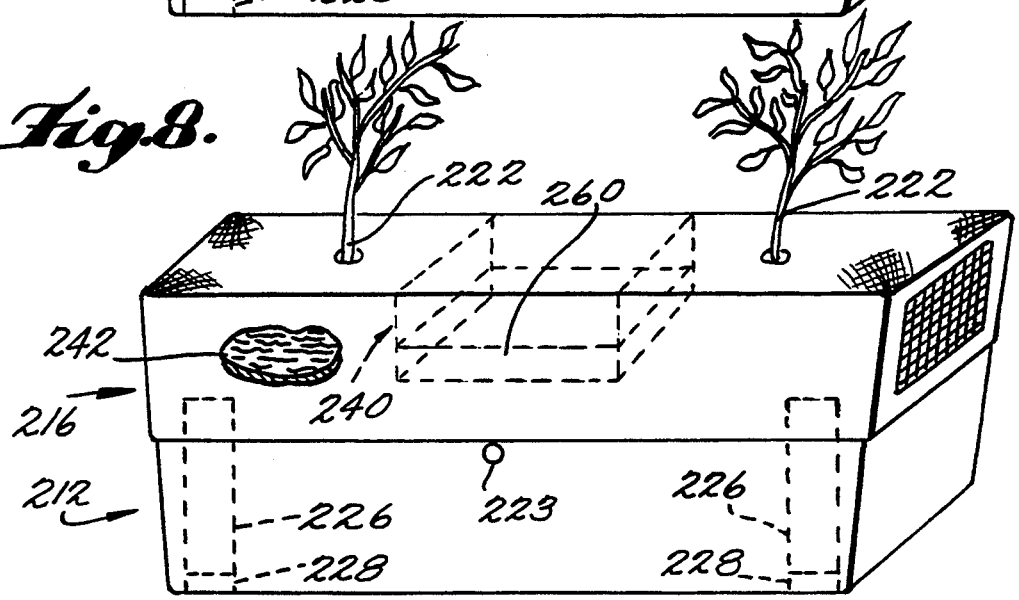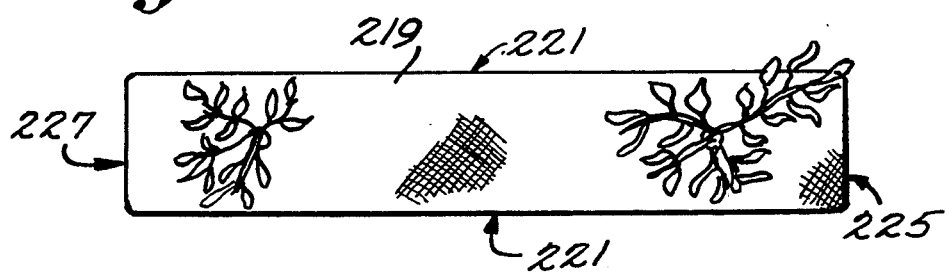

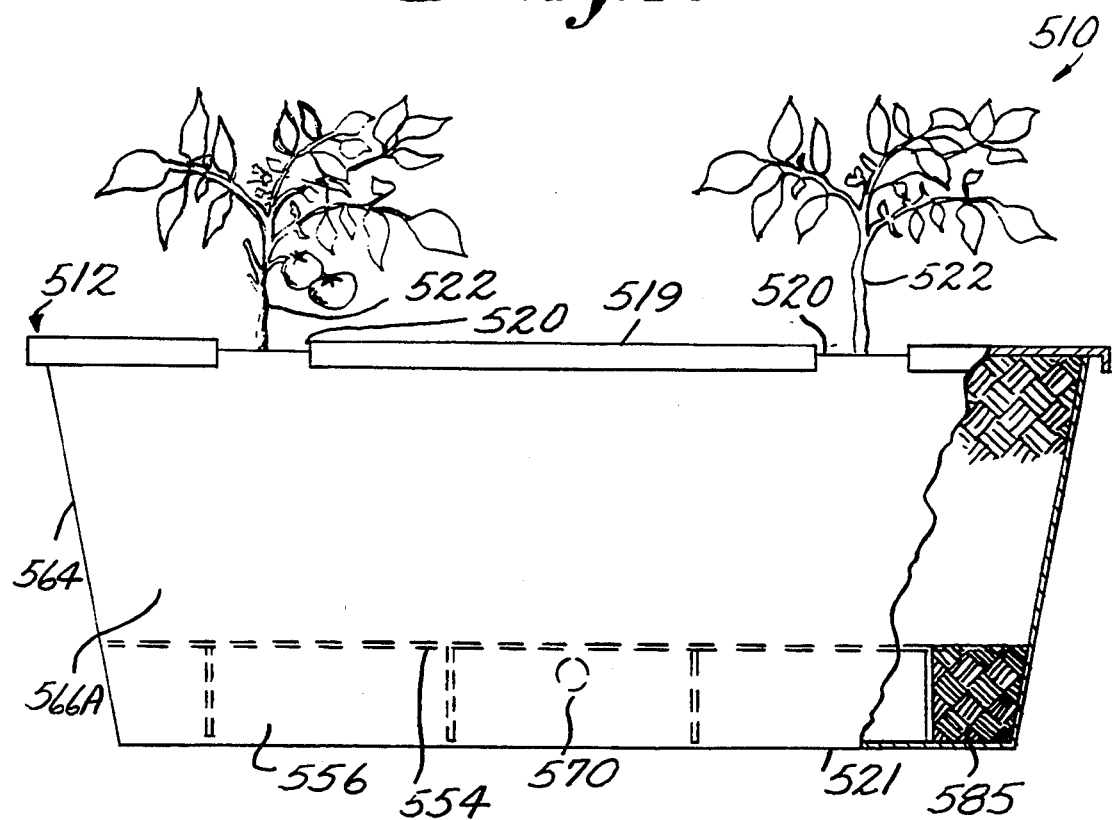
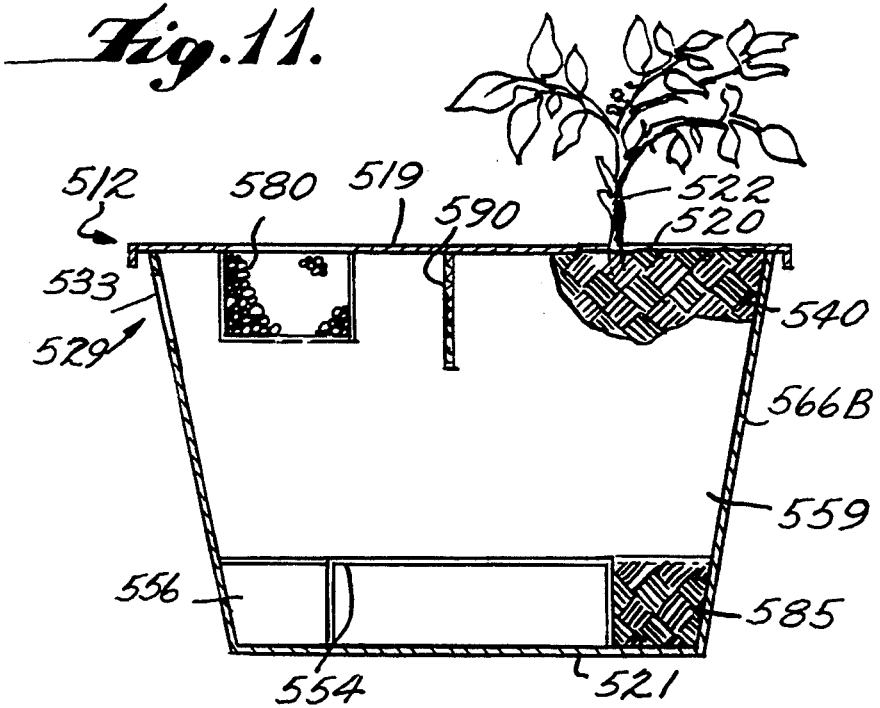

PLANT CULTIVATION APPARATUS AND METHOD

This is a continuation in part application of application Ser. No. 07/546,448 filed Jul. 2, 1990, now U.S. Pat. No. 5,193,306, granted Mar. 16, 1993.

FIELD OF THE INVENTION

The present invention relates to a cultivation apparatus and method which greatly minimizes the quantity of water and amount of labor required to grow plants to maturity. In particular, the invention relates to a water efficient and labor efficient apparatus and method for commercially growing tomatoes.

BACKGROUND OF THE INVENTION

In the cultivation of various plant species, numerous structures for housing a growing medium have been proposed to enable the grower to closely control the quantity of water supplied to the roots of the plant as well as to maintain the integrity of the growing medium. In general, these structures have involved a container for the growing medium together with an irrigation system for supplying water and other nutrients to the growing medium in the container. As compared to the natural cultivation of plant species directly in the ground, the use of such growing containers has not met with widespread acceptance due to the expense of the container and due to the rapid depletion of the nutrients in the growing medium employed.

These prior growing containers have also suffered the severe disadvantage of promoting the growth of undesirable parasites and fungi due to confinement of the growing medium in the containers. In addition, salt and mineral accumulation resulting from localized evaporation from the container has resulted in stunted plant growth or death of the plant. The only known solution to this detrimental mineral buildup has involved a significant investment in labor for attending to the condition of the soil in the container during the growing period. Accordingly, the disadvantages of such prior art growing containers have offset any advantages realized by their use.

Furthermore, the current production of produce for human consumption involves a significant amount of labor. The developing fruit of the plant must be kept off the ground to prevent the fruit from rotting and to allow sunlight to reach the fruit. In a common method for growing tomatoes, for example, individual tomato plants are planted in rows. At significant cost, stakes are then driven between successive tomato plants in the row. Wire is then strung between the stakes so that as the tomato plants grow, they can be tied to the wire/stake structure. This tieing of the plants, of course, also involves labor. Then, after picking, the plants must be cut from the stake structure, the wire removed, and the stakes pulled before the soil can be tilled. Then after tilling, the stakes must again be driven and the wire restrung. Despite the fact that presently employed growing staking apparatuses and methods are so labor intensive, staking is nevertheless carried out because cost effective and workable alternatives have not yet been developed.

SUMMARY OF THE INVENTION

The present invention provides an improved apparatus and method which avoids the problems inherent in the prior art and provides a cultivation system which will produce superior plant growth with a low labor cost. The present invention significantly reduces the quantity of water lost through evaporation, does not require disposal of the growing medium after each growing season, assures that salt does not accumulate around the plant's roots, and provides for the inexpensive and efficient picking and tending of the resultant plants.

In the preferred embodiment, the present invention provides a flexible bag container with a top surface and a bottom surface. This bag container contains a growing medium. First and second plant seeds or striplings are embedded beneath first and second openings provided in the top surface of the bag container. A third opening in the bag container serves as an evaporation opening or vent so that excess water supplied to the interior of the bag container can escape. The bag container is then disposed directly on the surface of a volume of hygroscopic medium. This hygroscopic medium is held by a water reservoir container which has an open top. Because the bottom surface of the bag container is provided with perforations, water in the bottom of the reservoir container is drawn up to the surface of the hygroscopic medium, through the perforations in the bottom surface of the bag container, and into the growing medium inside the bag container. The growing plants are therefore continuously supplied with moisture from water in the reservoir container.

According to the preferred method of using the preferred embodiment, the opening about the plant's stem is kept as small as possible to prevent or at least to minimize evaporation of water at this site. Maintaining the tight fit is easily effected by making the opening sufficiently small so that, as the stem increases in diameter, stem contact with the peripheral edge of the opening is maintained.

With this arrangement, the reservoir container assembly of the present invention may be left unattended for several days because the reservoir will continuously supply the required amount of moisture to the growing medium and because salt deposits from evaporation will be maintained at the third opening remote from plant's roots. Also, to compliment the water savings of the present invention, an arch support structure is provided to reduce labor costs associated with the developing plant. This arch support structure may be made of a rectangular piece of open mesh material. This square piece is, however, arched upward in one dimension to form an arch structure, complete with two downward pointing supporting portions.

According to the preferred method of use, the water reservoir assembly and the arch structure are used together. A number of the water reservoir container assemblies are first disposed in the field at an even spacing so that they form a line. The first and second openings of each reservoir container assembly are aligned to be perpendicular to the line of reservoir container assemblies. A number of arch support structures are then laid on the line of reservoir container assemblies so that a different arch structure spans the area between successive reservoir containers in the line. The supporting portions of the arch structures are made to rest on the bag containers so that none of the first and second openings are covered by an arch structure. Due to this configuration of the reservoir container assembly and the arch support structure, the plants which develop from the first and second openings grow over the arch structure and are thereby prevented from contacting the ground.

Because individual plants rest on the arch structures and are separated from the ground, the labor intensive tieing of plants to a structure is not required. Weeding of the field is also easily accomplished because the area underneath the arch structures is always readily accessible. Very importantly, a tomato plant growing on such an arch support structure will grow so that it is spread open from the top at its branching fork. Sunlight therefore penetrates the plant, the fruit ripens in the sun, and the exposed ripened fruit is easily seen and picked.

Upon completion of a growing cycle, the plants are easily removed from their supporting structure because they are not tied to anything. Because the arch support structures merely rest on the bag structures, the arch structures are easily pulled away from the reservoir container assemblies. Additionally, the growing medium in the bag container is readily removed from the bag for restoration of needed nutrients. The growing medium can thereafter be reused. Additionally, the hygroscopic medium in the water reservoir container can be fumigated to kill undesirable parasites and fungi which may have begun to grow in the container. Accordingly, the hygroscopic medium can also be reused.

BRIEF DESCRIPTION OF THE DRAWINGS

The foregoing and other advantages will become apparent as consideration is given to the following detailed description taken in conjunction with the accompanying drawings, in which:

FIG. 1 is a front view of the preferred embodiment of the reservoir container assembly of the present invention;

FIG. 2 is a view of the preferred embodiment similar to the view of FIG. 1 except that FIG. 2 shows the bag container removed to display the bottom surface of the bag container and the top surface of the hygroscopic medium in the water reservoir container;

FIG. 3 is a perspective view of the arch support structure of the present invention;

FIG. 4 is a view showing the preferred method of using the arch support structure in combination with the preferred embodiment of the reservoir container assembly;

FIG. 4A shows a continuous sheet of material which is unrolled over a line of reservoir container assemblies to protect plants from frost;

FIG. 4B shows a series of solid arch shaped structures disposed on top of a line of reservoir container assemblies to protect the plants from frost;

FIG. 4C depicts the arch support structure employed without the reservoir container structure;

FIG. 7 is a front view of the third embodiment of the present invention in which a box container replaces the bag container;

FIG. 8 is a front view of a modification of the third embodiment of the present invention;

FIG. 9 is a top plan view of a box container usable with the third embodiment of the present invention;

FIG. 10 is a side view of the fourth embodiment of the reservoir container assembly of the present invention;

FIG. 11 is an end view of the fourth embodiment of the reservoir container assembly of the present invention;

FIG. 13 shows the top wall, permeable partition, and water dividers removed, and FIG. 13 does not show the growing medium or plants.

DETAILED DESCRIPTION OF THE INVENTION PREFERRED EMBODIMENT

Figure 5:
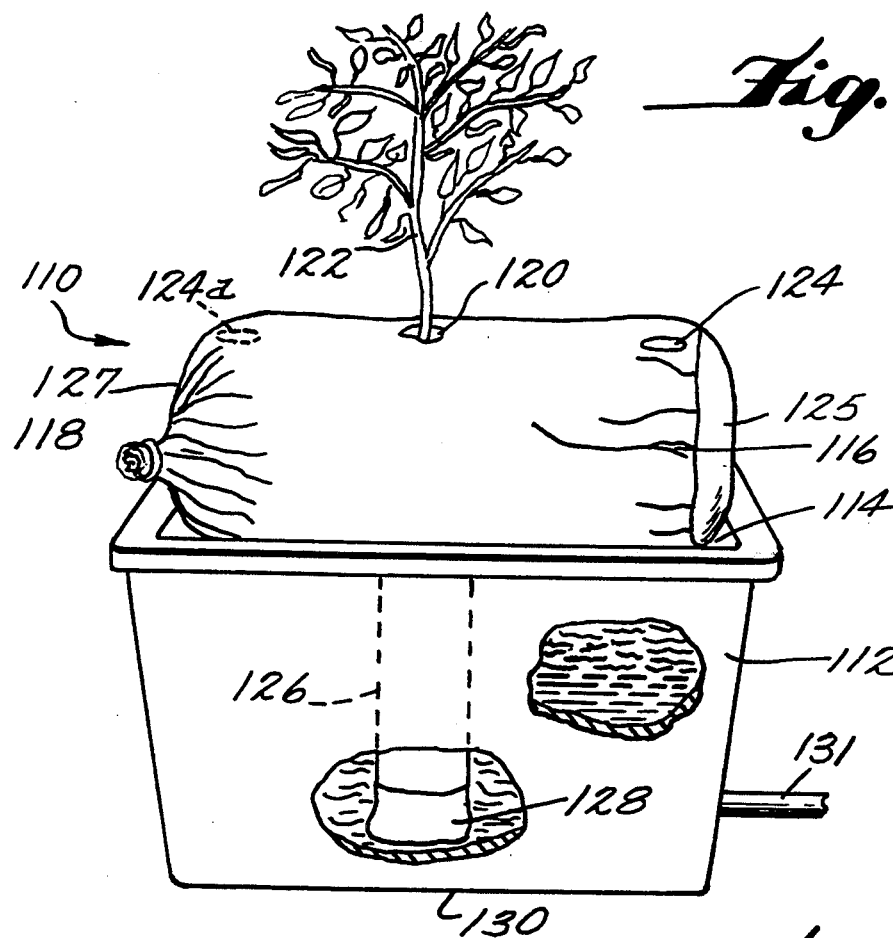
FIG. 5 is a front view of the second embodiment of the cultivation system of the present invention.

In the drawings, like numerals designate corresponding parts throughout the several views. FIGS. 1 and 2 show the preferred embodiment of the water reservoir container assembly of the present invention. The preferred embodiment is composed of two primary parts, a bag container 16 and a water reservoir container 12.

As shown in FIG. 1, the water reservoir container 12 is filled with a hygroscopic medium 42. The bag container 16 is disposed directly on top of the hygroscopic medium in the water reservoir container so that the bag container completely covers the top surface of hygroscopic medium inside the reservoir container.

It is the bag container 16 itself which is filled with the growing medium 40, such as soil, in which two plants 22A, 22B are grown. This soil may be mixed with a number of different nutrients depending upon the type of plant to be cultivated. The first plant 22A grows from a first opening 20A in the top surface 18 of bag container 16, whereas the second plant 22B grows from a second opening 20B in the top surface 18 of bag container 16. In FIG. 1, the first opening 20A is shown to be located in the top surface 18 at one end of the oblong bag container 16. The second opening 20B is shown to be located at the other end of the bag container 16.

In addition to the first and second openings, the top surface of the bag container also contains a third opening 24. This third opening facilitates the evaporation of excess moisture which may be present inside the bag container 16. The third opening 24 is located at a site remote from both the first and second openings 20A, 20B. Accordingly, salt and minerals which build up at the site of evaporation are kept away from the roots of developing plants 22A, 22B.

As shown in FIG. 1, the reservoir container has drain hole 50 located in its sidewall near the bottom 30 of the water reservoir container 12. Accordingly, when water is poured into the reservoir container, excess water drains from the drain hole 50 until the volume of standing water in the reservoir container is such that the level of water in the reservoir is no greater than the fill and drain water level 52.

In addition, the reservoir container 12 is provided with a permeable partition 54 which separates a drain volume 56 inside the water reservoir container from a hygroscopic medium volume 58 inside the water reservoir container. The drain volume 56 contains little if any hygroscopic medium whereas the hygroscopic medium volume 58 is filled with hygroscopic medium 42. When water is present in the bottom of the reservoir container, water is drawn through the immersed portions 60 of the permeable partition 54 and into the hygroscopic medium 42. Accordingly, as plants 22A, 22B grow, as water evaporates from the third opening 24, and as moisture is depleted from the bag container 16, moisture is continuously supplied to the bag container 16 through the permeable partition 54, the hygroscopic medium 42 in the reservoir container 12, and the perforations 34 in the bottom surface 32 of the bag container 16. In some applications, the reservoir assembly has a water supply line 31 which periodically supplies the reservoir container with water.

The bag container 16 shown in FIG. 1 is fashioned from a flexible bag, such as a common garbage bag, made of a water impervious material. Bags made of polyethylene film have proven successful in experimental growing. The flexible bag container may be filled with the plant growing medium 40 through the open end 18 of bag 16. The flexible material around the open end of the filled bag may then be bunched together and secured by a wire, staple, or the like 19.

The hygroscopic medium 42 used in the water reservoir container 12 may comprise sand, rock wool, common soil, or a combination of these materials. Common soil has been found to be the most effective and common soil is therefore depicted in the preferred embodiment of FIGS. 1 and 2.

To use the reservoir container assembly, the user deposits seed material immediately vertically below the first and second openings 20A, 20B to an appropriate depth depending on the type of plant to be grown. In the case of striplings, the striplings are planted to the appropriate depth through the openings. After sufficient growth of the stems 22A, 22B through the first and second openings 20A, 20B, the user reduces the size of the openings by manually adjusting their sizes about the plant stems. An alternative to manual adjustment is the addition of an auxiliary section of sheet material which is inserted through the openings to surround the stems 22A, 22B.

ARCH SUPPORT STRUCTURE

FIG. 3 shows the preferred embodiment of the arch support structure 400 of the present invention. In this embodiment, the arch support structure 400 is made in the shape of an arch, complete with two supporting portions 401A, 401B. Although the material from which these arches is made may either be a solid or an open mesh, a mesh is preferred to reduce the cost of the arch support structure as well as to facilitate herbicide and pesticide spraying through the arch support structure. When the plant is not being sprayed, an open mesh also facilitates the flow of air through the plant and around the fruit.

Reducing the cost of this arch support structure 400 is of critical importance to the economic viability of this invention. Accordingly, it is anticipated that high volume, low unit cost production of the arch support structure 400 will be possible. It is also conceivable that inexpensive arch support structures could be made of a durable plastic mesh from recycled milk containers. Alternatively, a wire mesh or a plastic coated wire mesh material may be employed.

As is apparent, the arch support structure 400 can assume a form other than that of an arch. Any form which will have adequate strength to support the weight of the plants above the surface of the soil can be used. The presently disclosed arch shape is deemed to provide a reasonably strong and stable structure for the amount of mesh material required in its construction.

FIG. 4 depicts the use of the arch support structure 400 in combination with the use of the preferred embodiment 10 of the reservoir container assembly. In FIG. 4, three reservoir container assemblies 410A, 410B, 410C are shown as well as two arch support structures 400A, 400B. The left most 410A and right most 410C reservoir container assembly are depicted attached to portions of two additional arch support structures 400C, 400D. This illustrates that the reservoir structures 410A, 410B, 410C are part of a long line of reservoir structures and that a different arch structure is disposed in between successive reservoir container assemblies in the line. Each of the reservoir container structures is oriented so that axis 401 containing first and second openings 422A, 422B is substantially perpendicular to the line 402 of reservoir container assemblies. A single water supply line 431 may also extend through all the container assemblies in the line.

In this preferred use of the reservoir container assembly and the arch support structure 400, two plants grow in each bag structure of each reservoir container assembly. In FIG. 4, the depicted plants are tomatoes plants, each of which has a branching fork 404. The plants therefore are opened from the top by this branching fork 404 and sunlight, depicted here as rays 405, penetrates the central portion of each of the plants. Weeding, spraying, pruning, and picking of the plants is therefore easily accomplished from either side of the line of reservoir container assemblies.

An additional advantage of the arch support structure 400 of the present invention is that the plants can be quickly and easily frost protected. As shown in FIG. 4, the plants, especially when they are small, are primarily located beneath the apexes 406C, 406A, 406B, 406D of the arch structures 400C, 400A, 400B, 400D. A covering can therefore be placed over the entire arch support structure in times of impending frost and the weight of the covering will be supported by the arch structure. This covering may take the form of a continuous sheet of material 407, a solid arch shaped structure 408, or any suitable protective material. FIG. 4A shows a line of reservoir container assemblies protected from the frost by a continuous sheet of material 407 which has been unrolled over the line. FIG. 4B shows a line of reservoir container assemblies protected from the frost by a series of solid arch shaped structures 408.

As depicted in FIG. 4C, the arch support structure 400 may also be employed independently from the reservoir container assembly. Pairs of individual tomato plants (plants 422A and 422B constitute a pair) are first planted or grown by seed directly in the soil. The pairs of plants are planted so that each pair is aligned perpendicularly to the line of pairs 402. Spacing along line 402 between successive pairs of plants is slightly larger than the breadth 411 of arch structure 400. Next, a plurality of arch structures are placed along the line 402 so that the axes 410 of each arch structure is aligned substantially perpendicular to line 402. One arch support structure is placed between successive tomato plant pairs so that the maturing tomato plants can grow over the arch structures. Apart from the water consumption benefits, the configuration of FIG. 4C provides many of the benefits realized with the embodiment of FIG. 4 including easy and inexpensive tending, spraying, ripening, and picking.

SECOND EMBODIMENT

Figure 6:
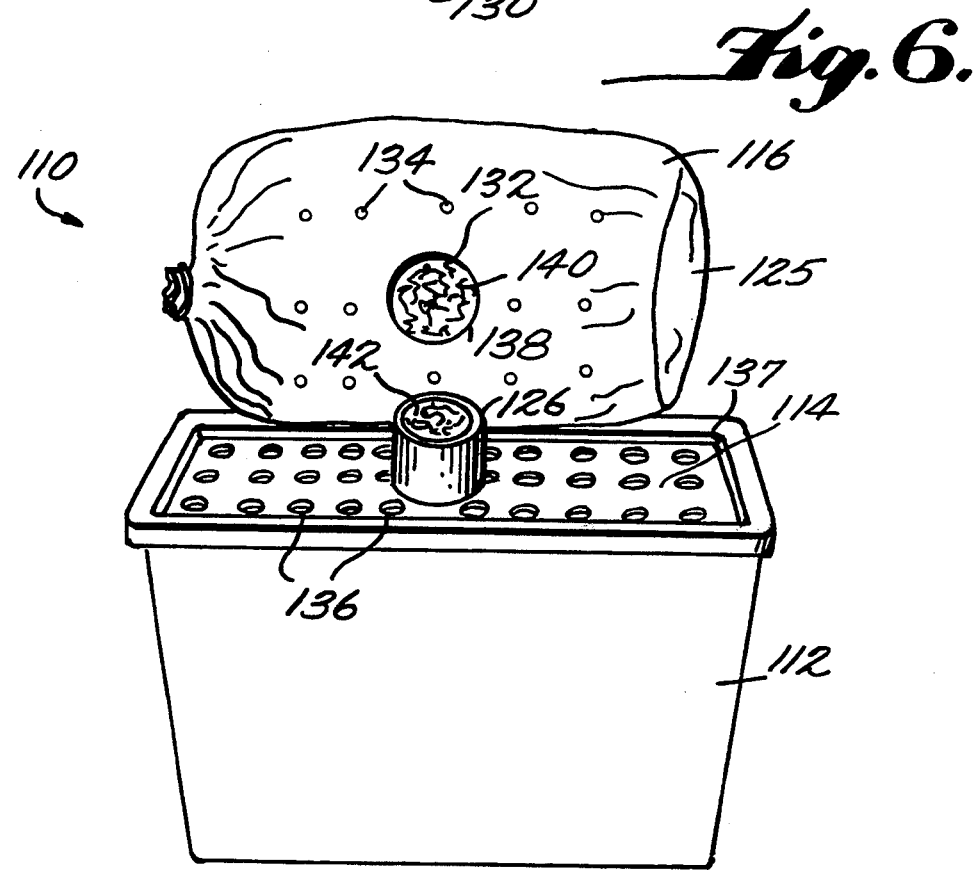
FIG. 6 is a view similar to FIG. 3 but showing the bag container removed to display its bottom surface and to display the top surface of the water reservoir container.

FIGS. 5 and 6 show a second embodiment of the reservoir container assembly 110 of the present invention. This embodiment can also used in combination with the arch shaped support structure of FIG. 3. In FIGS. 5 and 6, reference numerals corresponding to the elements of FIG. 1 and 2 are employed raised by 100.

As shown in FIGS. 5 and 6, second embodiment 110 includes a reservoir container 112 and a bag container 116. As in the preferred embodiment, container 116 contains a plant growing medium. The top surface of bag 116 is provided with an opening 120 through which a plant stem 122 extends as the plant increases in size. A separate opening 124 is spaced remotely from opening 120. Second opening 124 is provided to facilitate evaporation of excess moisture that accumulates in the interior of bag 116. As in the preferred embodiment, leaching of minerals that are unfavorable to plant growth occurs at a site in the bag remote from the developing roots of the plant 122. If desired, opening 124 can be placed in the opposite walls 127 or 125 or both walls of bag 116.

In this second embodiment, however, moisture is supplied to the interior of bag 116 through conduit 126. This conduit 126 extends upwardly through an opening in the top wall 14 of the reservoir container 112. As illustrated, conduit 126 has its lower end disposed adjacent to bottom wall 130 of reservoir container 112. The bottom end of conduit 126 is spaced a small distance from bottom surface 130 and may be enclosed in a water permeable sheath 128. This sheath is provided to serve as a filter for a number of possible water contaminants and also to serve as a means for retaining hygroscopic medium 142. As shown in FIG. 6, the hygroscopic medium 142 is deposited in conduit 126 preferably up to its upper end. The conduit 126 filled with the hygroscopic medium 142 then protrudes through the top wall 114 of the reservoir container a selected distance.

As shown in FIG. 6, bottom surface 132 of bag 116 is provided with an opening 138 which will closely interfit about the exterior of conduit 126 so that when opening 138 is placed over the upper end of conduit 126, the plant growing medium 140 comes into intimate contact with the hygroscopic medium 142 filling conduit 126. By proper selection of the hygroscopic medium, the foregoing arrangement assures transmission of moisture from the reservoir to the plant growing medium 140 filling bag container 116. It has been found that by filling conduit 126 with sand, rock wool, or a mixture of these materials, adequate moisture is provided.

In certain circumstances, it may be useful to provide drainage to bag 116. For this purpose, bottom 132 of the bag is provided with a number of perforations 134. In addition, upper wall 114 of container 112 is also provided with perforations 136. Accordingly, excess moisture from bag 116 can drain through perforations 134 in bag 116, through perforations 136 in the upper wall of container 112, and into reservoir container 112. Reservoir container 112 depicted in FIGS. 1 and 2 also has a recessed shoulder 137 for insuring that excess moisture which drains from bag 116 is returned through openings 136 to reservoir container 112.

Because opening 124 is of larger surface area than is opening 120, leaching of minerals takes place substantially in the vicinity of opening 124 and not in the vicinity of opening 120 through which plant growth occurs. By using a flexible rim for opening 120, the edge of the opening is maintained in intimate contact with the stem growing therethrough. As a result, evaporation of water through opening 120 is minimized. A second evaporation opening 124a indicated in broken lines may also be provided adjacent to the opposite end wall 127 of bag 116. Preferably, each of the openings 124 and 124a are equidistantly spaced along the longitudinal axis of bag 116 from opening 120. The location of opening 120 relative to the upper surface of bag 16 is, of course, arbitrary. The only limitation that must be observed is that opening 120 be spaced a suitable distance from each of the evaporation openings. In some circumstances, such as where large plant growths are contemplated, a water supply is conveniently attached to reservoir container 112 by a water supply line 131.

THIRD EMBODIMENT

FIGS. 7-9 show a third embodiment of the reservoir container assembly of the present invention. This embodiment can also be used in combination with the arch shaped support structure 400 of FIG. 3. In FIGS. 7-9, reference numerals corresponding to the elements of FIG. 1 and 2 are employed raised by 200.

According to this third embodiment, a rigid box 216 replaces the flexible bag as bag container 16. End walls 225 and 227 of box 216 are formed of screen mesh through which evaporation and the leaching of undesirable minerals takes place. Top wall 219 of box 216 may be open whereas opposing sidewalls 221 are made of rigid plastic or wood plank material. Top wall 219 of the box container 216 is covered by a sheet of plastic film having openings 220 therein for plant growth 222. The reservoir container 212 has a sidewall provided with a water supply opening 223. Conduit 226 with its filtering cap 228 functions substantially as described above in connection with the second embodiment.

As shown in FIG. 8, this embodiment may also involve two separate conduits 226. Having two conduits 226 helps provide even distribution of moisture from the reservoir container 212 into the upper box container 216. A wire mesh receptacle 240 may be provided in the plant growing medium on the interior of box container 216 for separating a fertilizing medium 260 from the plant growing medium 242. Wire mesh receptacle 240 also serves to separate the fertilizer from the roots of growing plant 222.

As shown in FIG. 9, top wall 219 of box container 219 may be a screen mesh. This mesh is subsequently covered with a protective film during the growing period to prevent evaporation. This construction results in both flexibility in seeding/planting as well as assurance that evaporation takes place remote from the growing roots.

Regardless of whether the preferred embodiment, the second embodiment, or the third embodiment is used, the entire contents of bag container 16, 116, or box container 216 may be removed after the completion of the growing season. The removed container with the growing medium can then be submerged in water for a period of time to kill off any accumulated fungi or parasites. The growing medium can also be fumigated to rid the growing medium of undesirable pests. Then, subsequent to the submersion and/or fumigation, suitable nutrients can be added to the sterilized medium. Accordingly, the necessity for removing the plant growing medium from containers 16 or 216 is avoided.

FOURTH EMBODIMENT

FIGS. 10-13 show a fourth embodiment of the reservoir container assembly 510 of the present invention. In FIGS. 10-13, reference numerals corresponding to the elements of FIG. 1 and 2 are employed raised by 500.

As shown in FIG. 10, the fourth embodiment 510 is comprised primarily of a single reservoir container 512. Said container may be made of a solid material such as recycled plastic. Growing medium volume 559 in reservoir container 512 is separated from drain volume 556 by a permeable partition 554 which may be plastic or rust proof metal screen. Growing medium volume 559 is filled with a growing medium 540 such as described above, in which plants 522 are grown.

Figure 12:
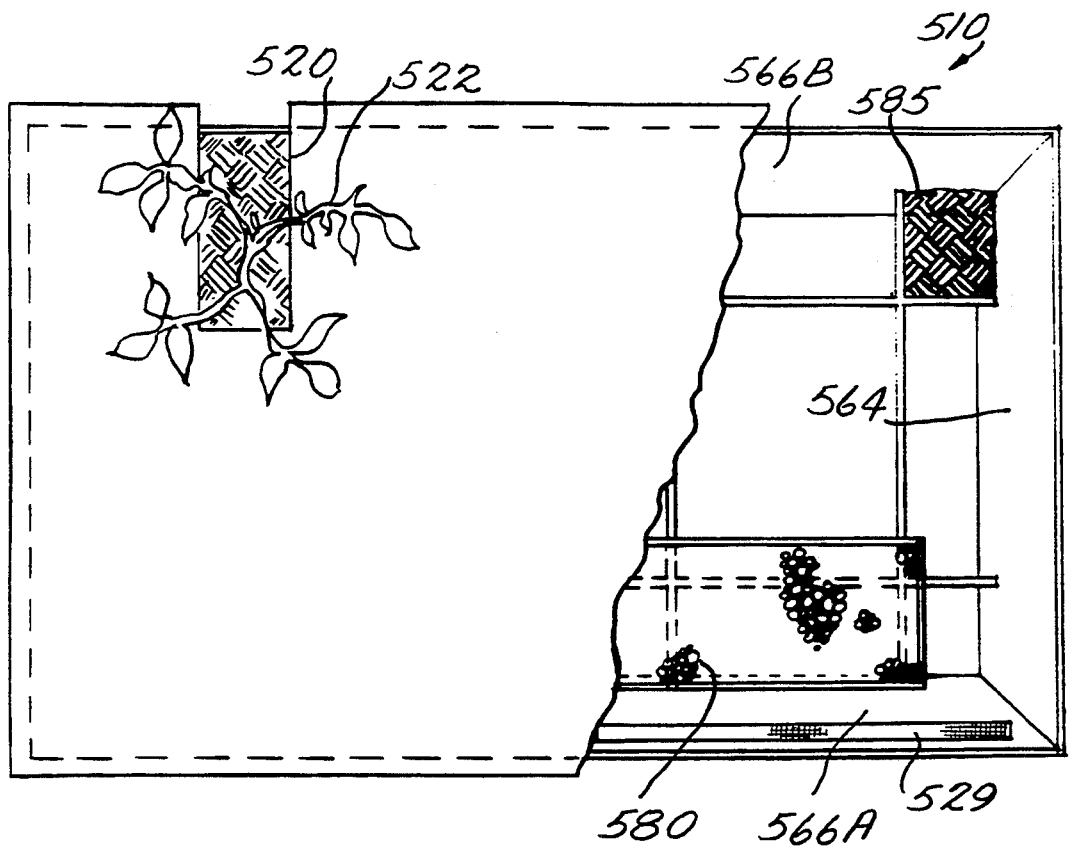
FIG. 12 is a top plan view of the reservoir container used with the fourth embodiment of the present invention.

Top wall 519 of reservoir container 512 may be made of made of a solid material such as recycled plastic. Reservoir container 512 has two end walls 564 and two lateral walls 566A, 566B (566B not shown in FIG. 10). Top wall 519 has openings 520 therein for plant growth 522, said plant openings being positioned along the side of top wall 519 adjacent to lateral wall 566B. FIG. 12 also shows the position of the openings 520.

As is shown in FIG. 10, there is at least one opening 570 in one of lateral walls 566A, 566B to allow excess water to flow out of drain volume 556 and thereby prevent the level of water (not shown) in drain volume 556 from accumulating above opening 570. This ensures that the top portion of drain volume 556 will be filled with air and thus provides that growing medium 540 has contact with air, such air being important for proper plant growth.

Figure 13:
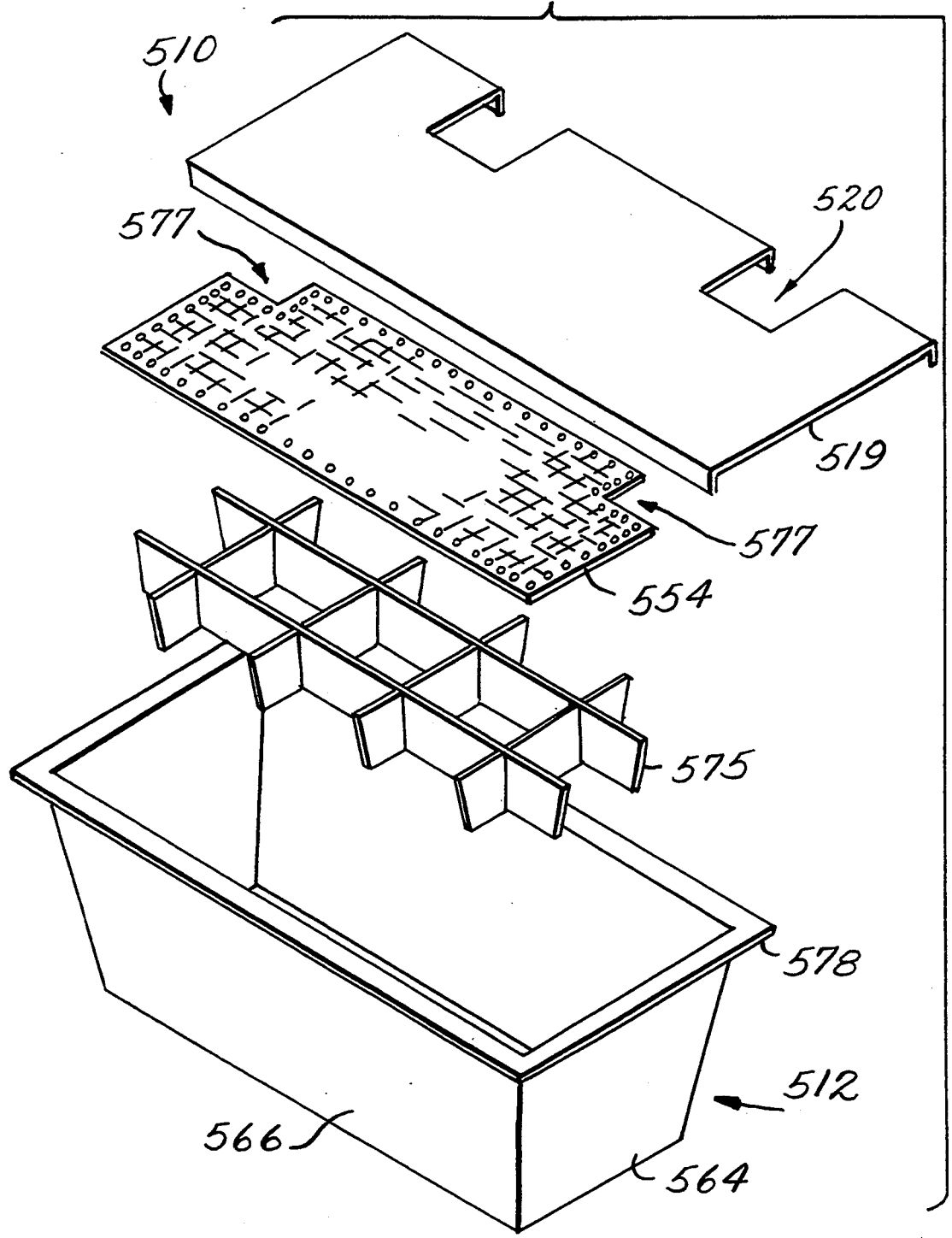
FIG. 13 is a view of the fourth embodiment similar to the view of FIG. 12 except that FIG. 13 is an angular view.

Growing medium columns 585 in drain volume 556 allow the water in said drain volume to reach from the lower portion of said drain volume into growing medium volume 559. Water will move up growing medium columns 585 and into growing medium volume 559 by the process of osmosis. As is also shown in FIG. 12, growing medium columns 585 must be positioned so that they are adjacent to the lateral wall 566B that is nearest to openings 520 in top wall 519. It is preferable that said growing medium columns be positioned in the corner of reservoir container 512, but growing medium columns can be positioned anywhere along lateral wall 566B. FIG. 13 shows openings 577 in the corners of permeable partition 554 which openings are above growing medium columns 585, said openings being made to provide a continuous area of growing medium extending to bottom wall 521.

As is shown in FIG. 11, one lateral wall 566A has an evaporation opening 529 to allow for evaporation. The evaporation opening may be covered with a screen 533 or may be uncovered. Screen 533 may be made of an open mesh material, which material may be durable plastic, rust proof metal, or similar material. The opening 529 must be in the lateral wall 566A that is opposite to the lateral wall nearest plant openings 520 and growing medium columns 585, as is also shown in FIGS. 11 and 12. This positioning is important to creating the proper flow pattern of moisture through reservoir container 512, as shall be discussed below.

FIG. 11 shows fertilizer mixture 580 which is placed into growing medium 540 at the top of growing medium volume 559. The fertilizer mixture must be placed near the lateral wall 566A which contains opening 529. Dividing wall 590 extends from top wall 519 into growing medium volume 559 and may be made of the same material as top wall 519. Dividing wall 590 should extend deep enough into growing medium volume 559 so that it extends below fertilizer mixture 580, but it should not extend all the way down to permeable partition 554.

The positioning of plant openings 520, growing medium columns 585, dividing wall 590, fertilizer mixture 580, and evaporation opening 529 causes the salt deposits occur remote from the roots of plants 522. Positioning of these elements is important because it ensures that the water passing next to plants 522 and out plant openings 520 has not previously passed though fertilizer mixture 580. Salt deposits will form where there is evaporation of water containing substances which the water has picked up by passing though the fertilizer. In this embodiment, however, the water that passes through fertilizer mixture 580 will not pass next to plants 522. Absorption causes the water in drain volume 556 to flow up growing medium columns 585 and though growing medium volume 559 to openings 520 and 529. There will be two separate flow paths leading away from growing medium columns 585, one path up to plant openings 520 and the other path across to evaporation opening 529. Dividing wall 590 prevents the water which has passed through fertilizer mixture 580 from flowing back across growing medium volume 559 towards plant openings 520 and plants 522.

As shown in FIG. 12, drain volume 556 is divided into compartments by dividers 575. Said dividers may be rectangularly shaped, may be positioned so as to be approximately perpendicular to top wall 519 and bottom wall 530, and may be interconnected with one another. The purpose of said dividers is to ensure that permeable partition 554 is positioned in reservoir container 512 so that said permeable partition lies parallel to bottom wall 521 and at a given height above bottom wall 521, thereby forming drain volume 556 (not shown in FIG. 13).

In addition, as is also shown in FIG. 12, there may be a flange 578 along the top of lateral walls 566 and end walls 564. Further, as is shown in FIG. 10, there may be a plurality of watering tubes 545 which extend down into drain volume 556 after passing though top wall 519, though growing volume 559, and though permeable partition 554. Watering tubes 545 allow for the easy pouring of water into drain volume 556.

As described above, the use of the reservoir container assembly of the present invention results in substantial savings in the amount of water required for healthy plant growth compared to prior art systems in which free drainage of water from the growing container is permitted. Very importantly, the cultivation system of the present invention simultaneously reduces the amount of water and the amount of labor required to produce vegetables such as tomatoes. Furthermore, due to the fact that both the reservoir container assembly and the arch support structure are reusable, the initial cost of the system can be recouped over time. Accordingly, an economically advantageous and water conserving system which requires little labor to operate is disclosed.

It will be apparent to those skilled in this art that various modifications may be made thereto without departing from the spirit and scope of the invention as defined in the following claims.

I claim:

1. A structure for commercially growing vegetables, comprising:
   a line of substantially evenly spaced reservoir container assemblies, each of said reservoir container assemblies comprising a growing medium container means with at least one plant growing opening therein, a second container means for holding a liquid and having a wall, conduit means extending from the interior of said second container means through said wall into the interior of said growing medium container means, said conduit means having means for assisting the transfer of liquid from said second to said growing medium container means, said growing medium container means having a second opening disposed remote from said at least one plant growing opening for allowing evaporation of liquid therethrough; and a number of arch support structures, one of said arch support structures being located in the space between each successive reservoir container assemblies in the line, each of said arch support structures being formed from a piece of flat material which is arched so that two opposing sides of the piece of material form supporting portions, the arch support structures being oriented so that each supporting portion is substantially perpendicular to said line.

2. The structure of claim 1, wherein each of said reservoir container assemblies also comprises a reservoir container means disposed beneath but in contact with the growing medium container, each reservoir container assembly containing a hygroscopic material for assisting the flow of water from said reservoir container means to said growing medium container means.

3. The structure of claim 2, wherein said growing medium container means has at least one opening where said growing medium container means contacts said reservoir container means, the opening allowing said water flow to enter a growing medium inside said growing medium container means.

4. The structure as claimed in claim 1, wherein each of said arch support structures is manufactured from an open mesh material which allows spraying and liquid to pass through the arch support structure.

5. A structure for commercially growing vegetables, comprising:

a line of substantially evenly spaced reservoir container assemblies, each of said reservoir container assemblies comprising a growing medium container means with at least one plant opening therein, a second container means for holding a liquid and having a wall, liquid conveying means for assisting in the transfer of liquid from said second container means to said growing medium container means through said wall, said growing medium container means having a second opening disposed remote from said at least one plant opening for allowing evaporation of liquid therethrough; and a number of arch support structures, one of said arch support structures being located in the space between each successive reservoir container assemblies in the line, each of said arch support structures being formed from a piece of flat material which is arched so that two opposing sides of the piece of material form supporting portions, the arch support structures being oriented so that each supporting portion is substantially perpendicular to said line.

* * * * *